United States Patent [19]

Lahalih et al.

[11] Patent Number: 4,686,790
[45] Date of Patent: Aug. 18, 1987

[54] DEGRADABLE AGRICULTURAL PLASTIC ARTICLES, E.G., MULCHING FILM, COMPRISING SLOWLY RELEASED MULTINUTRIENTS IN MATRIX OF THERMOPLASTIC, AND PROCESS FOR PREPARING SAME

[75] Inventors: Shawqui Lahalih, Rique; Saed-el-Deen Akashah; Farouk Al-Hajjar, both of Jabriaya, all of Kuwait

[73] Assignee: Kuwait Institute for Scientific Research, Safat, Kuwait

[21] Appl. No.: 792,656

[22] Filed: Oct. 29, 1985

[51] Int. Cl.$^4$ .............................................. A01G 7/00
[52] U.S. Cl. ........................................... 47/9; 428/518
[58] Field of Search ...................... 47/9, 58; 428/518

[56] References Cited

U.S. PATENT DOCUMENTS

| | | |
|---|---|---|
| 3,274,731 | 9/1966 | Vigneault et al. |
| 3,299,568 | 1/1967 | Tobolsky et al. |
| 3,341,357 | 9/1967 | Feild ............................. 47/9 X |
| 3,384,993 | 5/1968 | Kane. |
| 3,427,194 | 2/1969 | Lippoldt et al. ................ 47/9 |
| 3,454,510 | 7/1969 | Newland et al. |
| 3,590,528 | 7/1971 | Shepherd. |
| 3,707,056 | 12/1972 | Cole et al. |
| 3,810,328 | 5/1974 | Bryan et al. ..................... 47/9 |
| 3,812,615 | 5/1974 | Jamison. |
| 3,828,471 | 8/1974 | Anderson. |
| 3,833,401 | 9/1974 | Ingram. |
| 3,867,324 | 2/1975 | Clendinning et al. |
| 3,886,683 | 6/1975 | Hudgin et al. |
| 3,896,585 | 7/1975 | Miller et al. |
| 3,929,937 | 12/1975 | Clendinning et al. |
| 3,931,068 | 1/1976 | Clendinning et al. |
| 3,949,145 | 4/1976 | Otey et al. |
| 3,984,940 | 10/1976 | Reich et al. |
| 4,063,919 | 12/1977 | Grano, Jr. |
| 4,071,975 | 2/1978 | Tanaka et al. ................... 47/9 |
| 4,214,034 | 7/1980 | Kodera et al. .................. 47/9 X |

FOREIGN PATENT DOCUMENTS

| | | |
|---|---|---|
| 2203586 | 10/1972 | France. |
| 39-31668 | 6/1964 | Japan. |
| 41-13163 | 3/1966 | Japan. |
| 44-16216 | 7/1969 | Japan. |
| 52-72773 | 6/1977 | Japan. |
| 54-150490 | 11/1979 | Japan. |
| 56-72035 | 6/1981 | Japan. |
| 57-79822 | 5/1982 | Japan. |
| 57-83583 | 5/1982 | Japan. |
| 677419 | 8/1984 | South Africa. |
| 1253449 | 11/1971 | United Kingdom. |
| 273575 | 4/1970 | U.S.S.R. |
| 268074 | 6/1970 | U.S.S.R. |
| .1027183A | 7/1984 | U.S.S.R. |

OTHER PUBLICATIONS

Chem. Abstract, vol. 77, 1972, "Effect of the Stability of Bituminous Emulsions on Film Development in Liquid Mulches", Lehfeldt & Koepke.
Chem. Abstract, vol. 78, 1973, "Use of a Black Polyethylene Film for Forcing Bleached Asparagus", Bryzgalov & Shoshina.
Chem. Abstract, vol. 79, 1973, "Use of Herbicides in Cultures Under Plastic Sheets", Kampe & Mitt.
Chem. Abstract, vol. 80, 1974, "Application of Films for Fruit Cultivation", Dezso.
Chem. Abstract, vol. 85, 1976, "Biodegradable Liquid Polymers as Soil Mulches for Tomatoes", Everett & McLaughlin-Proc. Fla. State Hortic.
Chem. Abstract, vol. 89, 1978, "Photodegradable Films: Applications in Agricultural Mulching", LeBrasseur & Nicco.
Chem. Abstract, vol. 89, 1978, "Photodestructible Polyethylene Film for Agriculture", Zelenkova, Pashchenko, Borodulina et al.
Chem. Abstract, vol. 80, 1979, "Pesticides based on Thiocarbonates", Cousserans, Mathey, Scuflaire.
Chem. Abstract, vol. 93, 1980 "Photodestructible Polyethylene Films and Their Experimental Use", Borodulina, Kurzhenkova, Pashchenko et al.
Chem. Abstract, vol. 95, 1981, "Biodegradable Mulch Films", Agency of Industrial Sciences and Technologo Jpn. Kokai Tokkyo Koho.
Chem. Abstract, vol. 95, 1981, "Mulching Film That Forms Ventilation Slits with Seasonal Temperature Increase", Mitsubishi Petrochemical.
Chem. Abstract, vol. 96, 1982, "Plastic Films for Covering Plants", Sunwell Kogyo K.K. Misui Petrochemical Industries Ltd. Jpn. Kokai.
Proc. Fla. State Hort. Soc., 85:118, "Effect of Polyethylene Mulch Colour and Polyethylene Covered Frames on Strawberry Yield", Albregts.
Proc. Northeast Weed Control Conference, 24:328, "Weed Control in Transplanted Cucumbers Under Clear Plastic", Ashley, R. 1970.

(List continued on next page.)

Primary Examiner—Robert E. Bagwill
Attorney, Agent, or Firm—Willian Brinks Olds Hofer Gilson & Lione

[57] ABSTRACT

An agricultural mulch film is prepared by mixing conventional plant nutrients with a water-soluble polymer such as polyvinyl alcohol. The mixture is cast in the liquid form and allowed to dry to form a thin film. The dried film is then coated with a thin layer of a water-resistant resin such as polyvinyl acetate to form a composite mulch film. The release of the nutrients contained in the mulch film is controlled by the addition to the water-soluble polymer mixture of either (1) a nitrification inhibitor along with urea, or (2) a water-soluble urea-formaldehyde condensation product. The release of the nutrients is also controlled somewhat by the water-resistant resin coating. Other additives may be added to the mulch film to produce a multi-purpose product.

43 Claims, No Drawings

OTHER PUBLICATIONS

Can. J. Plastic Science 53:853, "Use of Black Polyethylene Mulch to Reduce Flooding Effects on Tomato Yields", Bolton, E. F. and Aylesworth, J. W. 1973.
Leningrad, Sel'skokhoz Inst. 173:56, "Use of Black Polyethylene Films for Forcing Bleached Asparagus", Bryzgalov, V. A. and Shoshina, L. M. 1972.
Plenochn. Polim. Materi Ikh Primen Mater. Kratkostochnogo Semin, 43, "Photodestructible Polyethylene Films and Their Experimental Use", Borodulina, M. Z. et al.
Res. Discl. 168:5, "Photodegradable Black Thermoplastic Mulching Film", Brackman, D. S. 1978.
Soil Sci. 130:271, "Effect of Solar Heating of Soils by Transparent Polyethylene Mulching on Their Chemical Properties", Chen, Y. and Katan, Y. 1980.
Proc. Fla. State Hortic. Soc. 88:233, "Biodegradable Liquid Polymers as Soil Mulches for Tomatoes", Everett, P. H. and McLanghlin, 1976.
Proc. Fla. State Hort. Soc. 84:124, "Evaluation of Paper and Polyethylene Coated Paper Mulches and Fertilizer Rates for Tomatoes", Everett, P. H. 1971.
Magy Kem Lapia, 27:430, "Application of Films for Fruit Cultivation", Ferdinand, D. 1972.
Int. J. Polymer Material 6:185, "A Controllable Photodegradable Polyethylene Film for Agriculture", Gilead, D. 1978.
Mitt. Olg. 88:490, "Use of Herbicides in Cultures under Plastic Sheets", Kampe, W. 1973.
Trop. Agric. (Triniad) 53:57, "Effect of Polyethylene and Aluminum Foil Mulches at Three Plant Populations of Yields of Glasshouse Tomatoes", Kratky, B. A. 1976.
Arch. Acherpfianzenbau Bodenk. 16:435, "Effect of the Stability of Bituminous Emulsions on Film Development in Liquid Mulches", Lehfeldt, J. and Koepke K. 1972.
Proc. Fla. State Hort. Sci. 81:147, "Influence of Polyethylene Mulch Colours and Soil Fumigants on Strawberry Production", Locascio, S. J. and Smart C. G. 1968.
Soil Crop Sci. Soc. Fla. Proc. 32:87, "Effects of Nitrogen Source and Rate and Use of Plastic Covers on Yield and Nutrient Status of Corn", Lutrick M. C. et al 1973.
Inf. Chim. 177:155, "Photodegradable Films: Applications in Agricultural Mulching", LeBrasseur G. and Nico, A. 1978.
Polym. Photochem. 1:15, "The Use of Photodegradable Polyethylene Film Containing Radiation Modified Static Polyethylene for Mulching", Omichi H. et al. 1981.
Ind. Eng. Prod. Res. Dev. 19:512, "Starch-Based Blown Films", Otey, F. H., Westhoff, R. P. and Doane, W. M. 1980.
Ind. Chem. Prod. Res. 16:305, "Biodegradable Films from Starch and Ethylene-Acrylic Acid Copolymer", Otey, F. H., Westhoff, R. P., and Russell C. R. 1977.
Nippon Sakumotus Gakkas Kiji, 37:645, "Contrivance and Utility of Herbicidal Film", Nakayama, K. T., Koiwa, T. and Noguchi, K. 1968.
Soil Sci. Soc. Amer. Proc. 38:678, "Water Repellent Soil Mulch for Reducing Fertilizer Nutrient Leaching: II. Variables Governing the Effectiveness of a Siliconate Spray[1]", Snyder, G. H., Ozaki, H. Y., and Hayslip N. C. 1974.
Plast. Massy. 8:57, "Photodestructible Polyethylene Film for Agriculture", Zalenkova, T. N., Pashchenko, T. E., Borodulina, Z. M. et al. 1978.
U.S. Dept of Commerce Nat. Tech. Info. Ser. PB-275 542, "Biodegradable Starch-based Films", Otey, F. H., and Westhoff, R. P., Sep. 28, 1977–Ser. No. 837,931.

DEGRADABLE AGRICULTURAL PLASTIC ARTICLES, E.G., MULCHING FILM, COMPRISING SLOWLY RELEASED MULTINUTRIENTS IN MATRIX OF THERMOPLASTIC, AND PROCESS FOR PREPARING SAME

BACKGROUND OF THE INVENTION

This application relates to agricultural plastic articles and, more particularly, to degradable mulch film comprising slowly released multi-nutrients in a matrix of thermoplastic resin material.

Agricultural mulch films are used extensively throughout the world because of the many advantages they provide, including retarded weed growth, increased soil retention of moisture and heat, and reduced soil erosion by winds and rain. Such mulching films also enhance soil structure by preventing soil crusting and soil compaction.

Polyethylene film, both in a transparent state and an opaque state, has been the most common plastic mulch to be used. However, polyethylene film is not degradable and it must be removed from the field and be burned, buried or otherwise discarded at the end of each fruiting season. Because the removal and burying or burning of plastic mulch is both costly and has an adverse effect on the ecology, the need for a plastic mulch that would decompose at the end of a growing season recently has become apparent. This need has led to the development of a variety of biodegradable and photodegradable mulch films. For example, Otey et al., U.S. Pat. No. 3,949,145 developed a biodegradable plastic film from starch, polyvinyl alcohol and glycerol, which film is covered with a water-resistant resin coating to prevent premature degradation. The water-resistant resin coating is prepared from a water-resistant resin, such as plasticized polyvinyl chloride, and a polyol-toluene diisocyanate prepolymer bonding agent.

Another biodegradable mulch film, disclosed by Clendinning, U.S. Pat. No. 3,929,937, is fabricated from a blend of a particulate addition polymer, such as polyethylene, in a matrix of biodegradable thermoplastic oxyalkanoyl polymer, such as ε-caprolactone homopolymer. Additional ingredients can be included in the blends. Such additional ingredients include naturally occurring biodegradable products, e.g., tree bark, sawdust, peat moss, cotton seed hulls, and the like, fibrous and non-fibrous fillers, e.g., talc, limestone, bentonite, asbestos, and the like, plant nutrients, fertilizers, insecticides, pesticides, and the like.

In addition to the films disclosed by Otey et al. (U.S. Pat. No. 3,949,145 discussed above), water sensitive agriculturally useful polyvinyl alcohol products have been disclosed by Grano, Jr., U.S. Pat. No. 4,063,919, and Iwasyk et al., U.S. Pat. No. 3,387,405. In Grano, Jr., there is disclosed a plastic fertilizer rod composition comprising about 100 parts of a polyvinyl alcohol, about 0 to 20 parts of a plasticizer and about 10 to 350 parts of a fertilizer. The rods generally are produced in diameters of from about ⅛ to about 1 inch or larger and are cut to a length of 1 to 6 inches or longer as desired.

In Iwasyk et al., there is disclosed a continuous foam mulch which is produced by applying and substantially simultaneously gelling a fluid aqueous foam which comprises at least 0.5 weight percent of dissolved polyvinyl alcohol and at least 50 percent, based on the weight of the polyvinyl alcohol, of emulsified asphalt or wax. The foams disclosed in Iwasyk et al. are intended for use as a continuous mulch film. However, it is evident that such foams lack the mechanical integrity of plastic films of the type disclosed, for example, in Otey et al. or Clendinning.

Still other agricultural mulch films have been disclosed by Vigneault et al., U.S. Pat. No. 3,274,731, and Kane, U.S. Pat. No. 3,384,993. Vigneault et al., for example, discloses a mulch film comprised of at least one copolymer consisting essentially of ethylene and an ethylenically unsaturated carboxylic acid monomer such as acrylic acid, methacrylic acid, fumaric acid, maleic acid and the like. Vigneault et al. suggests that their films might also contain nutrients such as ammonia or phosphate-containing additives, and other fillers for various mulching uses. Kane also discloses a plastic mulch film that may include solid water-soluble nutrients such as ammonium nitrate, potassium chloride, potassium nitrate, potassium sulfate and urea. However, the only plastic mulch films disclosed by Kane are comprised of polyethylene, polypropylene, cellulose acetate, cellulose acetate butyrate, polyvinyl chloride acetate, styrene acrylonitrite, Surlyn A, and the like. These plastic materials are not soluble in water and must, therefore, rely on some other mechanism to impart adequate degradability so that they may be used as an agricultural mulch film that does not have to be removed from the fields after the growing season. One such degrading mechanism is disclosed by Newland et al., U.S. Pat. No. 3,454,510. In that patent, it is taught to include a pro-oxidant in a water-insoluble polyolefin film, such as polyethylene, polypropylene or poly(butene-1). Among the pro-oxidants that are disclosed are certain metal acetyl acetonates, metal alkyl benzoylacetates, metal acetyl acetonates, metal stearates and metal oleates.

While the above-discussed mulch films, and others, have been used with some degree of success, no plastic mulching film disclosed to date has been found to be completely satisfactory in the sense that it provides an adequate balance of the important properties needed for a good mulch film. These properties include, for example, (1) good mechanical properties, (2) clarity, (3) the ability to retard weed growth without the incorporation of herbicides or black pigments, (4) degradability, (5) the incorporation of nutritional materials, (6) slow release characteristics, and (7) safety to the environment and ecology by excluding the addition of toxic chemicals.

SUMMARY OF THE INVENTION

Accordingly, it is an object of the present invention to provide a plastic mulch film which is characterized by an adequate balance of the above important properties.

It is another object of the present invention to provide a degradable agricultural plastic mulch film that contains multi-nutrients which are slowly released to plants.

It is another object to provide an improved composite mulch film which disintegrates over the course of a growing season such that it neither has to be removed from the field nor buried.

Still another object of the invention is to provide a plastic film mulch material which provides, in addition to the normal advantages of a conventional agricultural mulch film, the ability to release the necessary nutritional value to plants in a controlled manner and the ability to disintegrate so as not to require its removal from the field after a growing season, all at a reduced cost utilizing commercially available raw materials and conventional manufacturing techniques.

It is another object of this invention to provide a composite agricultural mulch film which solves the problems of littering, cost of mulch removal and cost of adding fertilizers and nutrients to the soil at controlled rates.

Another object of the invention is to provide an agricultural mulch film which does not contain any carbon black or other black pigments or fillers, but which, nonetheless, effectively retards or prevents the growth of weeds.

Yet another object is providing degradable mulch films which will slowly release multi-nutrients to plants, wherein the films are in a clear, opaque or colored form.

These and other objects and advantages will become apparent from a consideration of this entire specification, including the examples hereinafter described, and the appended claims.

In accordance with the present invention, it has now surprisingly been discovered that degradable plastic agricultural mulch films possessing the useful properties and characteristics such as described above can be prepared by first incorporating conventional plant nutrients such as urea, various phosphates, potassium and others in their simple or complex forms into a water-soluble synthetic resin film such as a polyvinyl alcohol film. The various nutrients are selected so as to include most if not all of the nutrients that would be required for the crop or crops to be mulched with the film, this collection of nutrients being referred to herein as "multi-nutrients." The slow release of the multi-nutrients is controlled in part by addition a nitrification inhibitor to the water-soluble polymer material along with the urea. In the alternative, a urea-formaldehyde water-soluble condensation product may be used in place of or in addition to the urea-nitrification inhibitor mixture. In either case, after the multi-nutrients have been added to the water-soluble polymer, the resulting mixture is cast in the liquid form and allowed to dry either at room temperature or at moderately elevated temperatures to form a thin film. After the film has dried it is then coated with a dilute solution of a water-resistant synthetic thermoplastic resin such as polyvinyl acetate or plasticized polyvinyl chloride. The water-resistant resin solution is allowed to dry to form an adherent thin layer on the water-soluble film. The water-resistant coating provides control over the degradability of the resulting composite film and its thickness is selected accordingly. The water-resistant coating also provides some additional control over the slow release characteristics of the multi-nutrients.

Other additives such as dyes, fibrous and non-fibrous fillers, alcohols such as methanol and the like may be added to the water-soluble polymer, the water-resistant coating, or both, as desired to enhance the properties of the resulting mulch film and to provide multi-purpose products. However, the use of carbon black, lamp black, or other black pigments and fillers generally is to be avoided.

DETAILED DESCRIPTION

According to the present invention, there are two major steps involved in preparing a multi-nutritional, slow release and degradable agricultural mulch film.

First, the preparation of a water soluble film comprising multi-nutrients and slow release nitrogeneous compounds. This step is accomplished by adding a predetermined weight of a water-soluble polymer to a reaction vessel containing water and phosphoric acid. Water-soluble polymers that may be used in the present invention include, for example, polyvinyl alcohol, carboxy methyl cellulose or polymethyl acrylate. However, the use of polyvinyl alcohol polymers having a molecular weight ranging from about 14,000–100,000 and a degree of hydrolysis ranging from about 86–100% is preferred. The reaction mixture is then heated at about 60°–100° C. with continuous stirring until all of the polymer is dissolved and a clear solution is obtained. Then urea or a urea-formaldehyde condensate solution is added to the reaction solution and heating is continued for an additional 5–10 minutes with continuous stirring until a clear solution is obtained. A nitrification inhibitor is then added in the case where a urea solution is used. After the reaction solution is cooled to room temperature, it is poured on a glass plate in an air-circulating oven set at about 60°–130° C. and is allowed to dry. The film prepared according to the above procedure has a thickness of about 0.1–0.25 mm and is very clear. The percentage of urea in the film ranges between 0–35% by weight, whereas the percentage of phosphoric acid is from about 15–25% by weight. The weight percent of polyvinyl alcohol in the film is from about 30–85% and, when used, the weight percent of the nitrification inhibitor is about 0.005–2%. A typical nitrification inhibitor that can be used in the present invention is thiourea. Other nitrification inhibitors include dicyandiamide, sulfathiazole, 2-mercapto-1,2,4-triazole, guanylthiourea, 2-amino-4-chloro-6-methyl-pyrimidine, 2-chloro-6-(trichloromethyl)-pyridine, and others.

When a urea-formaldehyde condensate is used as a source of nitrogen instead of urea, the percentage of urea-formaldehyde that is used may be up to about 70%. The urea-formaldehyde condensate, a slow release nitrogeneous compound, may be prepared by gradually adding a paraformaldehyde solution to an aqueous solution of urea, whereafter the pH of the mixture is adjusted to about 8–9 and the mixture is heated at about 90°–100° C. until the reaction mixture becomes clear. This normally takes about 20–30 minutes when a paraformaldehyde solution of about 90–95% concentration is added to a 40–50% aqueous urea solution at a formaldehyde to urea ratio of from about 2:1 to about 4:1. The preferred ratio of formaldehyde to urea is from about 2:1 to about 3:1.

The resulting clear solution is then acidified, for example, by the addition of concentrated sulfuric acid 12N, until its pH is lowered to about 4.5–5.6, and preferably to about 4.7–4.9. The reaction is then continued at the same temperature for an additional 20–30 minutes. The reaction solution is then neutralized by the addition of a 40% concentrated sodium hydroxide solution and is permitted to cool down to room temperature. Depending on the formaldehyde to urea ratio desired, an additional amount of urea is added and the pH is lowered to about 4.5–5.5, preferably 5.0 by the addition of a weak acid such as formic acid. Finally, the solution is neutralized to a pH of about 7.8 to 8.5 by the addition of a 40% solution of sodium hydroxide. The solid content in the final solution ranges between about 60–80%.

The second major step is the application of a thin coating film of a water-resistant thermoplastic resin onto the water-soluble film prepared as outlined above.

This is accomplished by dissolving a water resistant thermoplastic resin material, such as polyvinyl acetate having a molecular weight in the range of from about 45,000–160,000 in a suitable solvent, such as acetone. The actual dissolution may be accomplished by adding the polyvinyl acetate and acetoned to a reaction vessel and refluxing the mixture until all of the polymer is dissolved. The resulting solution is then cooled to room temperature and additional acetone is added, if necessary, to adjust the solid content of the solution to about 5–15% by weight. The water-soluble film prepared according to the first major step is then coated with the water resistant polymer solution prepared according to the second major step. The coating may be performed in any convenient manner, such as by dipping, spraying, doctoring, or the like. However, it is preferred that the coating be applied using a dip coating technique wherein the water-soluble film is passed through the solution of the coating polymer. The coating thickness is adjusted by controlling the viscosity of the coating solution and the speed of passage of the water-soluble film through the solution. Finally, the coated film is allowed to dry either at room temperature or at moderate temperatures in an air-circulating oven.

The film coating procedure outlined above results in a composite film that is clear, self-supporting, and appears as an integral body without any delamination. Even upon subsequent immersion of the film in water and drying, no delamination is observed. This is because the prepared urea-formaldehyde condensate acts as a slow release fertilizer and as a binder. The total coating thickness may vary, but it is preferred that the weight of the water-resistant coating comprise up to about 15%, and usually from about 2 to about 12% of the weight of the composite film depending upon the final application.

Although polyvinyl acetate is the preferred water-resistant thermoplastic resin for use as the coating film, other water-resistant resins can be used. Other suitable resins include, for example, plasticized polyvinyl chloride, ethylene/acrylic acid copolymers and ethylene/ethylacrylate copolymers. Mixtures of such water-resistant synthetic resins also can be used.

The additives, such as urea, urea-formaldehyde condensate, thiourea, phosphoric acid, phosphate salts and complexes, nitrate salts and complexes, potassium salts and complexes, and other nutrient salts and complexes, dyes, starch and the like are all used in proper preselected nutritional amounts relative to the amounts of water-soluble resin used to prepare the primary nutritional, slow release and degradable mulch film that is coated with the water-resistant thermoplastic resin.

The invention is more particularly described and explained by means of the following illustrative and non-limiting examples, in which, except as otherwise stated, all parts and percentages are by weight.

EXAMPLE 1

Urea-formaldehyde, a slow release nitrogenous compound and a binder, was prepared by dissolving (44.46 gm) of urea in (52 ml) of water. The solution was heated to 95° C. Then 120 ml of 94.0% concentration of paraformaldehyde was added and the pH of the solution was adjusted to 8 by the addition of a 40% sodium hydroxide solution. The reaction mixture continued at 95° C. with continuous stirring until a clear solution was obtained. The pH of the solution was then lowered to 4.8 by the addition of sulfuric acid 12N. After carrying out the reaction for an additional 30 minutes, the solution was neutralized by the addition of a 40% concentrated sodium hydroxide solution and cooled down to room temperature. Urea (45.78 gm) was then added to obtain a formaldehyde to urea ratio of 2.5, the pH was adjusted down to 5.0 by the addition of formic acid (90%), and the reaction was continued at 95° C. for 30 minutes. The solution was then neutralized by the addition of 40% sodium hydroxide solution after the reaction solution was cooled down to room temperature. The solid content of the final solution obtained was 75%. Its final viscosity of 20° C. was approximately 15,00 cp.

To prepare the mulching film, 24 gm of poly(vinyl alcohol) of two different molecular weights (M. Wt.=16,000 and 86,000) were added to a beaker containing 600 ml of water. The mixture was heated up to 70°–80° C. and was maintained at that temperature with continuous stirring until all of the polymer had dissolved and a clear solution was obtained. Then 75 ml of the urea-formaldehyde solution prepared according to the above procedure was added to the reaction mixture with continuous stirring. The solution was then cooled down to 40° C. The pH of the final solution was 6.3. The solution was then poured on a glass plate and placed in an air-circulating oven set at 110° C. After one to one and a half hours a clear film was obtained with a thickness ranging from 0.1 to 0.15 mm. The film was then coated with a coating solution of polyvinyl acetate prepared as follows: 80 gm of polyvinyl acetate with a molecular weight of 160,000 were added to a reaction flask containing 800 ml acetone. The reaction mixture was refluxed until all the polymer was dissolved and a clear solution was obtained. Then the clear film obtained previously was coated by dipping the film in the water-resistant coating solution and was dried. The film was weighed before and after coating and the percent coating was calculated to be 10.5%.

The mechanical properties of the film, such as tensile strength and elongation, and the dissolution rate, such as seven-day-dissolution rate at 38° C., were measured. The mechanical properties for coated films are shown in Table 1. The final composite film obtained was clear and flexible. There was no delamination of the composite film because the urea-formaldehyde condensate was prepared with dual functions. First, it acts like a source of nitrogen that is slowly released and second, it acts as a binder between the water-resistant coating film and the water-soluble nutritional film. The binds so formed are water soluble, but as the film dries they reappear, thus preventing any delamination until all the nutritional film is dissolved in the soil.

The mechanical properties were measured according to ASTM standard D 882-75b. The dissolution rates were measured as follows: After the film was coated and dried, its weight was recorded before and after coating. The original amount of urea was calculated. The films were then placed in a container and immersed in 100 ml of water and placed in an air-circulating oven held at 38° C. for 7 days. The amount of urea dissolved in water was then measured by using p-dimethylaminobenzaldehyde reagent dissolved in hydrochloric acid solution. This reagent reacts with the amino groups of urea producing a yellow color with an intensity proportional to the urea concentration. A spectrophotometer was used at a wavelength 442 nm to give the percent of urea dissolved in water. The percent dissolution of urea in water of this example was 25% for the uncoated sample and 15% for the coated sample when it was submerged in water at 38° C. for 200 hours.

EXAMPLE 2

The same procedure as in Example 1 was followed, except that starch was added to the nutritional film. The final composition of the nutritional film contained 60% urea-formaldehyde, 10% water-soluble starch and 30% polyvinyl alcohol. The film so obtained was clear and flexible and its mechanical properties are shown in Table 1.

EXAMPLE 3

The same procedure as in Example 2 was followed, except that urea, in addition to the urea-formaldehyde, was added to the nutritional film. The final composition of the nutritional film contained 50% urea-formaldehyde, 10% urea, 10% starch and 30.0% polyvinyl alcohol. The mulch film obtained was strong and flexible and its mechanical properties are shown in Table 1.

EXAMPLE 4-11

The same procedure as in Example 1 was followed, except that a urea-based nutritional film with a nitrification inhibitor, dyes, and phosphoric acid was used. In all of these examples, thiourea was the nitrification inhibitor that was used. The thiourea was present in the nutritional film at a concentration of 0.6%. The dye concentration was 0.4%. The percentage of urea ranged between 0–35% and phosphoric acid was used in ranges between 15% to 25%. The percentage of polyvinyl alcohol with a molecular weight of 14,000 ranged between 84% to 39%. The mechanical properties and composition of these films are shown in Table 2. The nutritional film prepared in accordance with Example 11 had a final composition of 35% urea, 25% phosphoric acid, 39% polyvinyl alcohol, 0.4% dye and 0.6% thiourea. The dissolution of urea in water after this film (Example 11) was submerged in water at 38° C. for 200 hours was 90% for the uncoated sample and 80% when the sample was coated with 8.4% polyvinyl acetate.

EXAMPLE 12

The same procedure was followed as in Example 11, except that water-soluble starch was added. The final composition of the nutritional film contained: 35% urea, 25% phosphoric acid, 10% starch, 29.0% polyvinyl alcohol, 0.6% thiourea and 0.4% dye. The film obtained was strong and flexible. The mechanical properties are shown in Table 1.

EXAMPLE 13-14

The same procedure as in Example 12 was followed, exceprt that urea-formaldehyde and starch were added. All samples contained 1% urrea-formaldehyde, 30% urea, 30% phosphoric acid, 0.4% dye and 0.6% thiourea. In addition, the films of Example 13 contained 38% polyvinyl alcohol, whereas the films of Example 14 contained 9% starch and 29% polyvinyl alcohol. The mechanical properties of the films are shown in Table 1.

TABLE 1

| | Mechanical Properties of Mulching Films | | | |
|---|---|---|---|---|
| | With polyvinyl alcohol of M. Wt. = 14,000 | | With polyvinyl alcohol of M. Wt. = 86,000 | |
| Example[1] | Tensile strength (kg/cm$^2$) | % elongation at break | Tensile strength (kg/cm$^2$) | % elongation at break |
| 1 | 67.5 | 172.0 | 107.6 | 158 |
| 2 | 69.2 | 146.6 | 58.6 | 149 |
| 3 | 65.0 | 235.0 | — | — |
| 12 | 36.6 | 263.0 | — | — |
| 13 | 41.4 | 253.0 | 65.4 | 279.7 |
| 14 | 21.7 | 89.6 | 54.3 | 250.0 |

[1]All the mulching films include an approximately 10% polyvinyl acetate coating. The polyvinyl acetate had a M. Wt. - 160,000.

TABLE 2

| Mechanical Properties of Uncoated Urea-based Mulch Film | | | | | |
|---|---|---|---|---|---|
| Example No. | % Urea | % Phosphoric acid | % PVA[1] | Tensile strength (kg/cm$^2$) | Elongation at break (%) |
| 4 | 0.0 | 15.0 | 84.0 | 380 | 240 |
| 5 | 5.0 | 15.0 | 79.0 | 310 | 300 |
| 6 | 10.0 | 15.0 | 74.0 | 280 | 300 |
| 7 | 15.0 | 15.0 | 69.0 | 260 | 325 |
| 8 | 20.0 | 15.0 | 64.0 | 210 | 360 |
| 9 | 25.0 | 15.0 | 59.0 | 160 | 370 |
| 10 | 30.0 | 20.0 | 49.0 | 100 | 340 |
| 11 | 35.0 | 25.0 | 39.0 | 65 | 320 |

[1]PVA is polyvinyl alcohol having a molecular weight of 14,000. Each film included 0.4% dye and 0.6% thiourea.

EXAMPLE 15

The mulch film of Example 1 was tested in the field alongside a conventional low density polyethylene film. The film of Example 1 was prepared as described in the example where the final composition of the nutritional water-soluble film was 70% urea-formaldehyde (formaldehyde/urea ratio=2.5:1) and 30% polyvinyl alcohol, (M. Wt. of PVA=86,000), and where the nutritional film was coated with 10.5% polyvinyl acetate (M. Wt. of polyvinyl acetate=160,000). The composite film was cut into strips 80 cm long and 30 cm wide. The strips weighed approximately 106.5 gm. Similarly, the low density polyethylene films were cut to the same dimensions from a general purpose low density polyethylene (LDPE) film stock.

Four small lots were prepared in Kuwait, having the same dimensions of 100 cm length by 40 cm width and were separated by dividers next to each other. Lot number 1 was covered with the mulching film of Example 1. The lots numbered 2 and 3 were covered with LDPE film, and lot number 4 had no plastic cover. Twenty-one holes were made in every plastic film. Twelve of those holes were used to plant corn seeds and the other nine holes were used to plant onion bulbs. Urea fertilizer was added to the lots numbered 2 and 4, while the lots numbered 1 and 3 received no fertilizers. Urea was added at four intervals. The amount of urea added was equivalent to the calculated value present in the film of Example 1 (estimated to be 28% or 28 gm). Therefore, 7 gms of urea were mixed with water and added every week for four consecutive weeks to the lots numbered 2 and 4. The experiment started during the burning hot summer months of Kuwait, when the temperature ranged between 45°–50° C. (113°–122° F.) on June 12, 1984. All lots were given the same amount of water (2500 ml) once a day. Several variables were measured once a week and recorded on film. The idea behind this experiment was to determine the efficiency of the nutritional film on plant growth and the growth of weeds. Table 3 shows the results of the experiment after one month. It was found that the percent sprouting and rate of growth of both corn and onions were significantly higher when the mulch film of Example 1 was used compared to conventional LDPE films with fertilizers. Also, there was no weed growth in lot number 1, while there was weed growth in the lots numbered 2, 3 an 4. The results are shown in Table 3.

Weathering studies on the above films were conducted according to ASTM G-53-77 "Recommended Practice for Operating Light and Water Exposure Apparatus (fluorescent UV-condensation type) for Exposure of Non-Metallic Materials" using an Atlas UVCON (ultra-violet condensation screening device) weatherometer. The source of UV radiation is obtained by using eight FS-40-T12 UV fluorescent sun lamps in the UVCON weatherometer. The cycle used for the accelerated degradation weathering study was: 4 hours of UV at 60° C. and 4 hours of condensation at 40° C.

TABLE 3

Effect of Mulch Film on the Growth of Corn, Onions and Weeds Under Kuwait Weather

| Lot No. | Type of mulch film used | Urea addition[1] in gm/week | % sprouting corn | % sprouting onions | Average height of corn plant after one month | Weed growth |
|---|---|---|---|---|---|---|
| 1 | Example 1 | None | 100 | 88 | 26.0 cm | None |
| 2 | LDPE | 7 | 85 | 55 | 23.0 cm | Few |
| 3 | LDPE | None | 50 | 44 | 22.0 cm | Several |
| 4 | None | 7 | 50 | 18 | 15.0 cm | Many |

[1]Urea was added four times only to give a total urea addition of 28 gm per indicated lots.

EXAMPLE 16

The same procedure as in Example 1 was followed, except that potassium nitrate and triethyl phosphate were added to produce three different types of nutritional mulch films with the following compositions: the first film (N) had 30% polyvinyl alcohol and 70% urea-formaldehyde, the second film (NK) had 25% polyvinyl alcohol, 10% potassium nitrate, and 65% urea-formaldehyde, and the third film (NPK) had 25% polyvinyl alcohol, 10% potassium nitrate, 10% triethyl phosphate and 55% urea-formaldehyde. All of the above films were coated with 10% polyvinyl acetate of molecular weight 160,000. The polyvinyl alcohol used had a molecular weight of 86,000.

The test was conducted at this cycle for two weeks. Mechanical properties such as tensile strength and percent elongation at break were measured on a standard film testing machine, Testometric 220D an electronic tensile tester. The cross-head speed of the machine grips was 200 m-M/min. The test was run at room temperature of $25+1°$ C. on standard samples that were cut by a standard dumb-bell shaped die B. The samples exposed in the weatherometer were removed and tested every two days. Since the mechanical properties are strongly affected by the level of moisture, one set of the samples to be tested was removed from the weatherometer during the condensation cycle (wet samples) while another set of samples was removed during the UV cycle (dry samples). Tables 4a and 4b show the results of the mechanical properties of the above prepared films upon accelerated aging.

TABLE 4a

Mechanical Properties of Several Mulch Films Upon Accelerated Weathering[1]

| Nutritional mulch film composition | Mechanical properties | Days of accelerated weathering[2] | | | | | | | |
|---|---|---|---|---|---|---|---|---|---|
| | | 0 | 2 | 4 | 6 | 8 | 10 | 12 | 14 |
| N film (30% PVA, 70% U/F coated with 10% PVAc) | Tensile strength (kg/cm$^2$) | 102 | 80.8 | 66.8 | 60.4 | brittle | — | — | — |
| | % Elong. @ break | 324 | 40 | 25 | 12 | brittle | — | — | — |
| N-K film (25% PVA, 10% KNO$_3$ 65% UF, coated with 10% PVAc) | Tensile strength | 122.5 | 103 | 79.6 | 67.8 | 63.1 | 60.0 | 59.11 | — |
| | % Elong. @ break | 237 | 150.5 | 88.9 | 58.1 | 37 | 14.5 | 11.4 | — |
| N-P-K film (25% PVA, 10% KNO$_3$, 10% TrEP[3], 55% U/F, coated with 10% PVAc) | Tensile strength | 84.5 | 83.0 | 103.5 | 83.6 | 112.7 | 95 | 104.4 | 106.7 |
| | % Elong. @ break | 318 | 191 | 106 | 87 | 88 | 44.6 | 17.1 | 14.2 |

[1]Samples were exposed in Atlas weatherometer according to ASTM G-53-77, cycle used: 4 hours U.V. at 60° C., 4 hours condensation at 40° C.
[2]The samples were taken out of the weatherometer during condensation cycle and tested immediately.
[3]TrEP is triethyl phosphate.

TABLE 4b

Mechanical Properties of Several Mulch Films Upon Accelerated Weathering

| Nutritional mulch film composition | Mechanical properties | Days of accelerated weathering[2] | | | | | | | |
|---|---|---|---|---|---|---|---|---|---|
| | | 0 | 2 | 4 | 6 | 8 | 10 | 12 | 14 |
| N film | Tensile | 102 | 139.4 | 161.0 | brittle | — | — | — | — |

TABLE 4b-continued

Mechanical Properties of Several Mulch Films Upon Accelerated Weathering

| Nutritional mulch film composition | Mechanical properties | Days of accelerated weathering[2] | | | | | | | |
|---|---|---|---|---|---|---|---|---|---|
| | | 0 | 2 | 4 | 6 | 8 | 10 | 12 | 14 |
| (30% PVA, 70% U/F coated with 10% PVAc) | strength (kg/cm²) % Elong. @ break | 324 | 24.6 | 17 | brittle | — | — | — | — |
| N-K film (25% PVA, 10% KNO₃ 65% UF, coated with 10% PVAc) | Tensile strength % Elong. @ break | 122.5 237 | 274.3 15.3 | 251 14.2 | 214 8.2 | 119.4 4.5 | 107.7 2.9 | — — | — — |
| N-P-K film (25% PVA, 10% KNO₃, 10% TrEP[3], 55% U/F, coated with 10% PVAc) | Tensile strength % Elong. @ break | 84.5 318 | 119.6 126.2 | 172.4 27.6 | 151.4 27.6 | 188.1 7.1 | brittle brittle | — — | — — |

[1]Samples were exposed in Atlas weatheromether according to ASTM G-53-77, cycle used: 4 hours U.V. at 60° C., 4 hours condensation at 40° C.
[2]The samples were taken out of the weatherometer during dry cycle and tested immediately (after dry UV).
[3]TrEP is triethyl phosphate.

EXAMPLE 17

Nutritional mulch films were prepared according to the procedure outlined in Example 16. The three different mulch films have the following compositions: N-films have 30% polyvinyl alcohol and 70% urea-formaldehyde, N-K films have 25% polyvinyl alcohol, 10% potassium nitrate and 65% urea-formaldehyde and N-P-K films have 25% polyvinyl alcohol, 10% potassium nitrate, 10% triethyl phosphate and 55% urea-formaldehyde. Samples of each of the films were coated with four different water-resistant coatings namely: 10% polyvinyl acetate, 4% ethylenevinyl acetate copolymer, 4% polyvinyl chloride and 4% ethylene-ethyl acrylate copolymer as shown in Table 5. The various samples prepared were then immersed in water in containers and placed in an air-circulating oven kept at 45+1° C. The weight loss of the immersed films was monitored over seven days. Table 5 shows the results of the seven day dissolution rates of the nutritional mulch films immersed in water at 45+1° C., while Table 6 shows the mechanical properties of these films in terms of tensile strength and percentage elongation to break.

TABLE 5

Seven Day Dissolution Rates of Nutritional Mulch Films Immersed in Water at 45° C.

| Nutritional mulch film compositions | % weight loss of immersed films at various times (days) | | | | | | |
|---|---|---|---|---|---|---|---|
| | 1 | 2 | 3 | 4 | 5 | 6 | 7 |
| N-film 30% PVA, 70% UF coated with | | | | | | | |
| a. 10% PVAc[1] | 41.9 | 45.3 | 53.0 | 60.0 | 72.3 | 79.5 | 87.4 |
| b. 4% EVA[2] | 55.2 | 57.4 | 60.7 | 62.1 | 63.1 | 79.8 | 83.2 |
| c. 4% PVC[3] | 41.5 | 48.4 | 56.6 | 59.6 | 63.6 | 67.2 | 71.7 |
| d. 4% EEA[4] | 37.1 | 57.6 | 75.6 | 80.1 | 87.7 | 88.2 | 90.4 |
| N-K film 25% PVA, 10% KNO₃, 65% UF: coated with | | | | | | | |
| a. 10% PVAc | 68.7 | 70.5 | 76 | 86.1 | 87.8 | 88.0 | 88.2 |
| b. 4% EVA | 66.1 | 69.9 | 72.9 | 73.2 | 73.4 | 76.2 | 78.4 |
| c. 4% PVC | 57.1 | 63.8 | 64.8 | 65.8 | 66.7 | 67.6 | 79.5 |
| d. 4% EEA | 58.5 | 60.1 | 67.8 | 70.1 | 81.8 | 83.1 | 84.2 |
| N-P-K film 25% PVA, 10% TeEP,[5] 10% KNO₃, 55% UF coated with | | | | | | | |
| a. 10% PVAc | 68.2 | 69.5 | 73 | 80.2 | 81.5 | 83 | 85 |
| b. 4% EVA | 67.1 | 71.0 | 71.2 | 74.9 | 75.0 | 75.9 | 77.9 |
| c. 4% PVC | 42.4 | 44.1 | 45.4 | 50.8 | 50.9 | 51.0 | 61.3 |
| d. 4% EEA | 72.1 | 76.3 | 77.4 | 85.9 | 88.2 | 90.0 | 93.1 |

[1]PVAc is polyvinyl acetate sold by BDH Chemicals Ltd., Poole, England.
[2]EVA is polyethylene-vinyl acetate (10%) copolymer sold by DuPont under EVa3125.
[3]PVC is polyvinyl chloride sold by Singapore Polymer Corp. under SH 61.
[4]EEA is polyethylene-ethylacrylate copolymer sold by Union Carbide under DPDA-6182
[5]TeEP is triethyl phosphate.

TABLE 6

The Mechanical Properties of Nutritional Mulch Film of Example 17.

| Nutritional mulch film compositions | Mechanical Properties | |
|---|---|---|
| | Tensile strength (kg/cm²) | % Elongation @ break |
| N-film 30% PVA, 70% UF coated with | | |
| a. 10% PVAc[1] | 102.0 | 324 |
| b. 4% EVA[2] | 81.8 | 219 |
| c. 4% PVC[3] | 85.2 | 188 |
| d. 4% EEA[4] | 70.7 | 253 |
| N-K film 25% PVA, 10% KNO₃, 65% UF: coated with | | |
| a. 10% PVAc | 122.5 | 237 |
| b. 4% EVA | 86.0 | 169 |
| c. 4% PVC | 89.3 | 166 |
| d. 4% EEA | 106.6 | 190 |
| N-P-K film 25% PVA, 10% TeEP,[5] 10% KNO₃, 55% UF coated with | | |
| a. 10% PVAc | 84.5 | 318 |
| b. 4% EVA | 90.0 | 206.3 |
| c. 4% PVC | 94.6 | 206.5 |
| d. 4% EEA | 85.2 | 196.0 |

[1]PVAc is polyvinyl acetate sold by BDH Chemicals Ltd., Poole, England.
[2]EVA is polyethylene-vinyl acetate (10%) copolymer sold by DuPont under EVa3125.
[3]PVC is polyvinyl chloride sold by Singapore Polymer Corp. under SH 61.
[4]EEA is polyethylene-ethylacrylate copolymer sold by Union Carbide under DPDA-6182
[5]TeEP is triethyl phosphate.

EXAMPLE 18

Several samples were prepared according to the procedure outlined in Example 1, except that in addition to a nitrogeneous source, potassium and phosphorous sources were added. Table 7 shows the composition of the various samples that contain the three main nutritional elements namely N-P-K, (i.e., nitrogen, phosphorous and potassium) where these clear films have up to 80% nutritional sources and still have good mechanical properties. Dipotassium hydrogen phosphate was used to maximize the presence of potassium and phosphorous elements in the films and maintain the clarity of the films by preventing crystallization.

TABLE 7

Mechanical Properties of Some Samples Prepared in Example 18.

| N-P-K mulch film composition | | | | | Mechanical Properties | | |
|---|---|---|---|---|---|---|---|
| % PVA[1] | % KNO$_3$ | % TrEP | % K$_2$HPO$_4$ | % U-F | Tensile strength (kg/cm$^2$) | % Elong. @ break | Clarity |
| 25 | 10 | 10 | 0.0 | 55 | 84.5 | 318 | clear film |
| 25 | 10 | 10 | 5.0 | 50 | 70 | 372 | clear film |
| 25 | 10 | 10 | 10.0 | 45 | 103 | 270 | clear film |
| 25 | 16 | 11 | 0.0 | 48 | 82.5 | 251 | opaque |
| 25 | 16 | 11 | 5.0 | 43 | 93.7 | 208 | opaque |
| 20 | 5 | 5 | 20.0 | 50 | 76.7 | 209 | opaque |

[1]PVA is Polyvinyl alcohol having a molecular weight of 100,000.

From the foregoing description and illustrative examples and tables, it is readily apparent that mulch films prepared in accordance with the present invention are characterized by an excellent balance of properties. Not only do the films exhibit good mechanical properties, such as tensile strength and % elongation at break, but they exhibit excellent weed growth control without the need for herbicides or the incorporation of black pigments to shut out light. The mulching film prepared in accordance with the present invention is clear. The film is prepared in such a way as to provide a distinctive crystallographic structure where the morphology is responsible for reducing the transmission of light through the film. The reduction in light transmission is further enhanced upon the absorption of water during the irrigation period. This reduction in transmissivity results in an increase in light absorption and reflection at the shorter wave lengths, hence reducing light transmission necessary for weed growth. Therefore, the clear mulching film prepared according to the invention prevents weed growth without the addition of herbicides and carbon black. This is a great advantage since no toxic materials are needed to be added to the film. Additionally, this provides an economic advantage to the user.

The mulch films of the present invention also exhibit the distinct advantage of containing several multifunctional ingredients, such as a slowly released nitrogeneous source. Firstly, the nitrogeneous source provides the nutrient element nitrogen. Secondly, since the nitrogeneous source comprises either urea in combination with a nitrification inhibitor or a urea-formaldehyde polycondensate, it releases the nutrient element of nitrogen at a controlled rate. Thirdly, the urea-formaldehyde condensate has an adhesive property whereby it binds the substrate (i.e., polyvinyl alcohol with the various nutrients) to the thin water-resisting coating layer, thus preventing delamination of the composite film when it is exposed to strenuous mechanical stresses. A fourth desirable property of the urea-formaldehyde condensate nitrogeneous source is that it is added to the water-soluble resin solution in an aqueous form such that it is compatible therewith and such that the resulting film is a clear, strong, flexible, degradable and slow release nutritional film. By comparison, when only urea and a nitrification inhibitor are added as a nitrogeneous source, the resulting film develops microcrystals which cause the film to turn from a clear film to a crystalline opaque film as time goes on.

Another multi-functional additive that may be included in the film preparation is an alcohol such as methanol. The methanol may be added to the water-soluble resin solution as a compliment to or as a partial replacement for the water that is present. The added methanol provides at least two advantages. First, it raises the viscosity of the solution, thereby resulting in a uniform casted mulch film. Second, since methanol has a lower boiling point temperature than water, the use of methanol results in a faster cycle time of the film preparation, thus maximizing the production rate and minimizing the production cost.

Yet another multi-functional additive that may be used is dipotassium hydrogen phosphate. This additive acts as a source for potassium and phosphorous which are nutrient elements, and it also prevents the formation of microcrystals that would form when a high percentage of potassium nitrate and triethyl phosphate are included in the mulch film. In the presence of dipotassium hydrogen phosphate it is possible, therefore, to have a mulch film with 80% fertilizers and still have a clear film with good balanced properties.

It is also readily apparent that while the degradation mechanism of the mulch film of the present invention depends primarily on the fact that the casted nutritional film is prepared from a water-soluble resin, the mechanism depends also upon the fact that water-soluble nutrients and additives contained in the film are leached therefrom so as to change the morphology of the composite film and thereby render the composite film more susceptible to mechanical failure. The rate of degradation due to the presence of the nutrients is greater than that of the dissolution of the water-soluble polymer carrier. This change in morphology is accomplished by the presence of the nutrients in the film, without resorting to the inclusion of starch or antioxidants or other additives that jeopardize the mechanical properties of the films or make them too expensive.

It will be appreciated that the instant specification and examples are set forth by way of illustration and not limitation and that various modifications and changes may be made without departing from the spirit and scope of the present invention as defined by the appended claims.

What is claimed is:

1. A self-supporting, composite, degradable agricultural mulch film, which comprises:
   (a) a first film formed from a water-soluble synthetic resin and having admixed therein at least one releasable form of nitrogen, at least one releasable plant nutrient in addition to nitrogen, and at least one agent which functions to slow the release of nitrogen from said first film; and
   (b) a second film formed as an adherent coating on said first film, said second film comprising a water-resistant synthetic resin, said second film functioning to retard the degradation rate of the composite mulch film, to further slow the rate of release of said nitrogen, and to slow the rate of release of said plant nutrient other than nitrogen.

2. The agricultural mulch of claim 1, wherein said water-soluble synthetic resin comprises polyvinyl alcohol, and wherein said polyvinyl alcohol comprises from about 20% to about 85% of said first film.

3. The agricultural mulch of claim 2, wherein said polyvinyl alcohol has a molecular weight ranging from about 14,000-100,000 and a degree of hydrolysis ranging from about 86-100%.

4. The agricultural mulch film of claim 3, wherein said first film has a thickness on the order of about 0.1-0.25 mm, and wherein said composite film is free from any black pigment or filler.

5. The agricultural mulch of claim 2, wherein said water-resistant resin is selected from the group consisting of polyvinyl acetate, plasticized polyvinyl chloride, ethylene/acrylic acid copolymers, and ethylene/ethylacrylate copolymers, and mixtures thereof.

6. The agricultural mulch of claim 5, wherein said second film comprises up to about 15% by weight of the composite film.

7. The agricultural mulch of claim 6, wherein said water-resistant resin comprises polyvinyl acetate having a molecular weight in the range of from about 45,000-160,000.

8. The agricultural mulch of claim 6, wherein said releasable plant nutrient comprises at least one member selected from the group consisting of phosphoric acid, potassium salts and complexes, phosphate salts and complexes, nitrate salts and complexes and mixtures thereof.

9. The agricultural much of claim 2, wherein said releasable form of nitrogen comprises at least one member selected from the group consisting of urea, water-soluble urea-formaldehyde condensates, and mixtures thereof; provided, however, that when urea is present as the only releasable form of nitrogen, said first film further comprises a nitrification inhibitor.

10. The agricultural mulch of claim 9, wherein said releasable form of nitrogen comprises urea, and wherein said first film further comprises a nitrification inhibitor, said urea being present in said first film in an amount up to about 35% by weight.

11. The agricultural mulch of claim 10, wherein said nitrification inhibitor is thiourea, and wherein said thiourea is present in said first film in an amount up to about 2% by weight.

12. The agricultural mulch film of claim 11, wherein said second film comprises up to about 15% by weight of the composite film.

13. The agricultural mulch of claim 12, wherein said second film comprises from about 2% to about 12% by weight of the composite film.

14. The agricultural mulch of claim 13, wherein said water-resistant resin is selected from the group consisting of polyvinyl acetate, plasticized polyvinyl chloride, ethylene/acrylic acid copolymers, and ethylene/ethylacrylate copolymers, and mixtures thereof.

15. The agricultural mulch of claim 9, wherein said releasable form of nitrogen comprises a water-soluble urea-formaldehyde condensate, and wherein said urea-formaldehyde condensate is present in said first film in an amount up to about 70% by weight.

16. The agricultural mulch of claim 9, wherein said first film comprises 0-35% urea, 0-70% water-soluble urea-formaldehyde condensate, and from about 15-25% phosphoric acid.

17. The agricultural mulch of claim 16, wherein said second film comprises up to about 15% by weight of the composite film.

18. The agricultural mulch of claim 17, wherein said second film comprises from about 2% to about 12% of the composite film.

19. The agricultural mulch of claim 18, wherein said water-resistant resin is selected from the group consisting of polyvinyl acetate, plasticized polyvinyl chloride, ethylene/acrylic acid copolymers, and ethylene/ethylacrylate copolymers, and mixtures thereof.

20. A clear, degradable agricultural mulch film which is substantially free from any black pigments or fillers, which comprises:
   (a) a first film formed from a water-soluble synthetic resin; and
   (b) a second film formed from a water-resistant synthetic resin and coated on said first film such that said first film and said second film define the clear, degradable agricultural mulch film;
   said first film comprising, in addition to said water-soluble resin, at least one nitrogenous source, at least one releasable plant nutrient other than said nitrogenous source, and at least one constituent which functions to slow the release of nitrogen from said mulch film during use;
   said second film comprising up to about 15% by weight of said mulch film and functioning to delay the degradation of said mulch film and to cooperate with said constituent in said first film for slowing the release of nitrogen from said mulch film.

21. The agricultural mulch of claim 20, wherein said nitrogeneous source comprises at least one member selected from the group consisting of urea, water-soluble urea-formaldehyde condensates, and mixtures thereof, wherein said urea may be present in said first film in an amount up to about 35% by weight, wherein said urea-formaldehyde condensate may be present in said first film in an amount up to about 70% by weight, wherein said water-soluble resin is present in said first film in an amount of from about 20% to about 85%, and wherein said first film further comprises up to about 2% by weight of a nitrification inhibitor when urea comprises the only nitrogenous source in said first film.

22. The agricultural mulch of claim 21, wherein said nitrification inhibitor is thiourea.

23. The agricultural mulch of claim 21, wherein said water-soluble resin comprises polyvinyl alcohol.

24. The agricultural mulch of claim 21, wherein said releasable plant nutrient comprises at least one member selected from the group consisting of phosphoric acid, potassium salts and complexes, phosphate salts and complexes, nitrate salts and complexes and mixtures thereof.

25. The agricultural mulch of claim 23, wherein said water-resistant resin is selected from the group consisting of polyvinyl acetate, plasticized polyvinyl chloride, ethylene/acrylic acid copolymers, and ethylene/ethylacrylate copolymers, and mixtures thereof.

26. The agricultural mulch of claim 25, wherein said polyvinyl alcohol has a molecular weight ranging from about 14,000–100,000 and a degree of hydrolysis ranging from about 86–100%.

27. A method of preparing a clear, multi-nutrient-containing degradable agricultural mulch film, which comprises the steps of:
(a) forming an aqueous admixture comprising a water-soluble synthetic film-forming resin, at least one nitrogenous constituent which functions as a releasable source of nitrogen, and at least one plant nutrient in addition to said nitrogenous constituent;
(b) casting a film from the admixture resulting from step (a);
(c) drying the film resulting from step (b);
(d) coating the dried film resulting from step (c) with a layer of a water-resistant thermoplastic resin to form the degradable mulch film, said layer being sufficiently thick so that the amount of water-resistant thermoplastic resin comprises up to about 15% by weight of the resulting mulch film, said layer of water-resistant resin functioning to retard the rate of release of nitrogen from said mulch film and to retard the rate of degradation thereof.

28. The method of claim 27, wherein the water-soluble resin used in step (a) comprises polyvinyl alcohol, wherein the nitrogenous constituent is a member selected from the group consisting of urea, water-soluble urea-formaldehyde condensates, and mixtures thereof, and wherein a nitrification inhibitor is added to said admixture when urea is selected as the nitrogenous constituent.

29. The method of claim 28, wherein the water-resistant resin used in step (d) comprises a member selected from the group consisting of polyvinyl acetate, plasticized polyvinyl chloride, ethylene/acrylic acid copolymer, ethylene/ethylacrylate copolymer and mixtures thereof.

30. The method of claim 29, wherein the polyvinyl alcohol used in step (a) has a molecular weight ranging from about 14,000–100,000 and a degree of hydrolysis ranging from about 86–100%; wherein said polyvinyl alcohol comprises from about 20% to about 85% by weight of the dried film resulting from step (c); and wherein said water-resistant resin comprises from about 2% to about 12% by weight of said coated mulch film.

31. The method of claim 29, wherein the coating step (d) comprises the sub-steps of: ($d_1$) preparing a solution of said water-resistant resin in a solvent for said resin; ($d_2$) coating the film resulting from step (c) with the solution resulting from step ($d_1$); and ($d_3$) removing the solvent from the coated film resulting from step ($d_2$).

32. The method of claim 31, wherein the aqueous admixture formed in step (a) comprises urea as said nitrogenous constituent; wherein the dried film resulting from step (c) comprises up to about 35% by weight of urea, from about 20% to about 85% by weight polyvinyl alcohol and from about 0.005% to about 2% by weight of a nitrification inhibitor; and wherein the coated mulch film resulting from step (d) comprises from about 2% to about 12% by weight of said water-resistant resin.

33. The method of claim 32, wherein said water-soluble resin used in step (a) comprises polyvinyl alcohol having a molecular weight ranging from about 14,000 to about 100,000 and a degree of hydrolysis ranging from about 86–100%; and wherein said water-resistant resin used in step (d) comprises polyvinyl acetate having a molecular weight in the range of from about 45,000–160,000.

34. The method of claim 31, wherein the aqueous mixture formed in step (a) comprises a water-soluble urea-formaldehyde condensate as said nitrogenous constituent; wherein the dried film resulting from step (c) comprises up to about 70% by weight of said urea-formaldehyde condensate and from about 20% to about 85% by weight polyvinyl alcohol; and wherein said coated mulch film resulting from step (d) comprises from about 2% to about 12% by weight of said water-resistant resin.

35. The method of claim 34, wherein said water-soluble resin used in step (a) comprises polyvinyl alcohol having a molecular weight ranging from about 14,000 to about 100,000 and a degree of hydrolysis ranging from about 86–100%; and wherein said water-resistant resin used in step (d) comprises polyvinyl acetate having a molecular weight in the range of from about 45,000–160,000.

36. The method of claim 29, wherein the coating step (d) comprises the sub-steps of: ($d_1$) preparing a solution of said water-resistant resin in a solvent for said resin; ($d_2$) coating the film resulting from step (c) with the solution resulting from step ($d_1$); and ($d_3$) removing the solvent from the coated film resulting from step ($d_2$).

37. The method of claim 29, wherein the aqueous admixture formed in step (a) comprises urea as said nitrogenous constituent; wherein the dried film resulting from step (c) comprises up to about 35% by weight of urea, from about 20% to about 85% by weight polyvinyl alcohol and from about 0.005% to about 2% by weight of a nitrification inhibitor; and wherein the coated mulch film resulting from step (a) comprises from about 2% to about 12% by weight of said water-resistant resin.

38. The method of claim 29, wherein the aqueous mixture formed in step (a) comprises a water-soluble urea-formaldehyde condensate as said nitrogenous constituent; wherein the dried film resulting from step (c) comprises up to about 70% by weight of said urea-formaldehyde condensate and from about 20% to about 85% by weight polyvinyl alcohol; and wherein said coated mulch film resulting from step (d) comprises from about 2% to about 12% by weight of said water-resistant resin.

39. A method of preparing a degradable agricultural mulch film, comprising the steps of:
(a) forming an aqueous mixture comprising (i) a water-soluble film-forming resin (ii) a nitrogenous constituent selected from the group consisting of urea, water-soluble urea-formaldehyde condensates, a mixtures thereof, and (iii) at least one plant nutrient other than said nitrogenous constituent; said admixture further comprising of (iv) a nitrification inhibitor when urea is selected as the only nitrogenous constituent;

(b) casting a film from the admixture resulting from step (a);

(c) drying the film resulting from step (b), the resulting dried film having a water-soluble resin content of from about 20% to about 85% by weight;

(d) preparing a solution of a water-resistant resin;

(e) coating the film resulting from step (c) with the resin solution prepared in step (d); and (f) removing the solvent from the coated film resulting from step (e) to form a degradable agricultural mulch film having a water-resistant resin content of up to about 15% by weight.

40. The method of claim 39, wherein the water-soluble resin used in step (a) comprises polyvinyl alcohol having a molecular weight ranging from about 14,000–100,000 and a degree of hydrolysis ranging from about 86–100%; and wherein the water-resistant resin used in step (d) comprises a member selected from the group consisting of polyvinyl acetate, plasticized polyvinyl chloride, ethylene/acrylic acid copolymers, ethylene/ethylacrylate copolymers and mixtures thereof.

41. The method of claim 40, wherein said nitrogeneous constituent used in step (a) comprises urea; wherein the dried film resulting from step (c) comprises up to about 35% by weight of said urea and from about 0.005% to about 2% by weight of said nitrificationn inhibitor; and wherein the coated mulch film resulting from step (f) comprises from about 2% to about 12% by weight of said water-resistant resin.

42. The method of claim 40, wherein said nitrogeneous constituent used in step (a) comprises a water-soluble condensate of urea-formaldehyde; wherein the dried film resulting from step (c) comprises up to 70% by weight of said urea-formaldehyde condensate; and wherein said coated mulch film resulting from step (f) comprises from about 2% to about 12% by weight of said water-resistant resin.

43. The method of claim 40, wherein the plant nutrients (iii) used in step (a) comprise at least one member selected from the group consisting of phosphoric acid, potassium salts and complexes, phosphate salts and complexes, nitrate salts and complexes and mixtures thereof.

* * * * *

UNITED STATES PATENT AND TRADEMARK OFFICE
CERTIFICATE OF CORRECTION

PATENT NO. : 4,686,790

DATED : August 18, 1987

INVENTOR(S) : Saed-el-Deen Akashah et al.

It is certified that error appears in the above-identified patent and that said Letters Patent is hereby corrected as shown below:

On the Title Page, Item [19] should read -- Akashah et al.

Item [75] should read -- Saed-el-Deen Akashah, Jabriaya, Shawqui Lahalih, Rique, and Farouk Al-Hajjar, Jabriaya, all of Kuwait --.

Signed and Sealed this

Nineteenth Day of January, 1988

Attest:

DONALD J. QUIGG

*Attesting Officer*   *Commissioner of Patents and Trademarks*